(12) United States Patent
Yu et al.

(10) Patent No.: US 12,473,974 B2
(45) Date of Patent: *Nov. 18, 2025

(54) ELECTRONIC SHIFT CONTROL APPARATUS

(71) Applicants: Hyundai Motor Company, Seoul (KR); Kia Corporation, Seoul (KR)

(72) Inventors: Jae Yeon Yu, Hwaseong-Si (KR); Yeong Jik Kim, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/679,242

(22) Filed: May 30, 2024

(65) Prior Publication Data

US 2025/0243929 A1    Jul. 31, 2025

(30) Foreign Application Priority Data

Jan. 29, 2024   (KR) ........................ 10-2024-0013401

(51) Int. Cl.
*F16H 59/10*   (2006.01)
*B60K 20/06*   (2006.01)

(52) U.S. Cl.
CPC ........... *F16H 59/105* (2013.01); *B60K 20/06* (2013.01)

(58) Field of Classification Search
CPC ......... F16H 2059/006; F16H 2059/026; F16H 2059/0295; F16H 59/0278; F16H 61/24; B60K 20/06

See application file for complete search history.

(56) References Cited

U.S. PATENT DOCUMENTS

| | | | | |
|---|---|---|---|---|
| 3,811,020 | A | * | 5/1974 | Johnson ................ B60W 30/18 74/473.23 |
| 3,969,951 | A | * | 7/1976 | Blackwood .............. B62D 1/16 74/552 |
| 5,775,165 | A | * | 7/1998 | Lu ........................... F16H 61/24 74/540 |
| 12,209,656 | B2 | * | 1/2025 | Kim ...................... F16H 59/105 |

(Continued)

FOREIGN PATENT DOCUMENTS

| KR | 10-0656936 B1 | 12/2005 |
|---|---|---|
| KR | 10-2022-0065468 A | 5/2022 |
| KR | 10-2024-0126221 A | 8/2024 |

OTHER PUBLICATIONS

Non-Final Office Action dated Mar. 26, 2025, U.S. Appl. No. 18/678,242.

*Primary Examiner* — Minnah L Seoh
*Assistant Examiner* — Gregory T Prather
(74) *Attorney, Agent, or Firm* — Morgan Lewis & Bockius LLP

(57) ABSTRACT

In a column-type electronic shift control apparatus of which position may be varied not only by driving a driving unit but also by a predetermined amount of external force, the shift control apparatus includes a housing; a column unit including one end portion rotatably coupled to the housing, protruding from the housing in a radial direction, and operable for shifting; a driving unit provided in the housing and engaged to the column unit to rotate the column unit; and an override unit provided in the driving unit to transmit driving force to the column unit, and enable the column unit to rotate when external force is applied.

15 Claims, 8 Drawing Sheets

(56) References Cited

U.S. PATENT DOCUMENTS

| | | | |
|---|---|---|---|
| 2018/0259062 A1* | 9/2018 | Wang | F16H 61/0006 |
| 2018/0283543 A1* | 10/2018 | Cha | F16H 61/24 |
| 2020/0003300 A1* | 1/2020 | Yang | G01D 5/145 |
| 2021/0172512 A1* | 6/2021 | Soave | F16H 63/483 |
| 2022/0154816 A1 | 5/2022 | Song et al. | |
| 2024/0271697 A1 | 8/2024 | Kim et al. | |

* cited by examiner

ELECTRONIC SHIFT CONTROL APPARATUS

CROSS-REFERENCE TO RELATED APPLICATION(S)

The present application claims priority to Korean Patent Application No. 10-2024-0013401 filed on Jan. 29, 2024, the entire contents of which is incorporated herein for all purposes by this reference.

BACKGROUND OF THE PRESENT DISCLOSURE

Field of the Present Disclosure

The present disclosure relates to a column-type electronic shift control apparatus of which a position may be varied not only by a driving unit but also by a predetermined amount of external force.

Description of Related Art

In general, among transmission devices installed in vehicles, a shift-by-wire transmission device may be an electronic transmission device configured to control transmission by receiving an electrical signal according to a shift control of a driver. This shift-by-wire transmission device may have a structure in which a shift lever operates, like a switch, to electrically send a signal and operates the transmission with a driving device such as a solenoid, a motor, or the like.

In the present manner, there may be an advantage that the electronic transmission device, based on shift-by-wire, transfers transmission intention of the driver as an electric signal to a transmission control unit by a simple operation, and the transmission control unit controls the driving device, making the shift control to a D (forward driving) stage, an R (reverse driving) stage, an N (neutral) stage, or the like more easily. Furthermore, the transmission device may be miniaturized, allowing a wide space to be secured between a seat for the driver and a seat for a front passenger.

On the other hand, when an abnormal external force is applied to the shift lever, shifting may be easily performed, or in severe cases, a component such as a shift lever, a gear member, a driving unit, or the like, making up the transmission device, may be damaged. When damage to components occurs due to abnormal operations, shifting of the vehicle becomes impossible, and eventually the function of the transmission device may be inevitably lost.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a column-type electronic shift control apparatus of which position may be varied not only by a driving unit but also by a predetermined amount of external force.

According to an aspect of the present disclosure, a shift control apparatus includes a housing; a column unit including one end portion rotatably coupled to the housing, protruding from the housing in a radial direction, and operable for shifting; a driving unit provided in the housing and engaged to the column unit to rotate the column unit; and an override unit provided in the driving unit to transmit driving force to the column unit, and enable the column unit to rotate when external force is applied.

The driving unit may include a motor fixed in the housing via a support member; a gear unit engaged to the motor and the column unit and transmitting driving force of the motor to the column unit; and a shaft rotatably supporting at least a portion of the gear unit.

A permanent magnet may be fixed on one side of an end portion of the shaft, a printed circuit board provided with a Hall sensor and controlling driving of the motor may be built in the housing, and the Hall sensor may detect rotation of the column unit through a change in magnetic flux of the permanent magnet due to rotation of the shaft.

The gear unit may include a worm mounted on a motor axis of the motor; a worm wheel including an annular shape and engaged with the worm; an intermediate gear mounted on the shaft and disposed coaxially with the worm wheel, and the override unit connecting the worm wheel and the intermediate gear, wherein the intermediate gear may engage with a sector gear formed on one end portion of the column unit.

The worm wheel may be rotatably supported in a support hole of the support member by a stepped portion formed on one edge portion thereof, and the shaft may be disposed to pass through and rotate relative to the worm wheel, and may be fixed to the intermediate gear to rotate together.

The override unit may include a first override gear unit formed on the other edge portion on an internal surface of the worm wheel; a plurality of spline groove portions formed on an internal surface of a side wall in an accommodation groove of the intermediate gear; an override ring member in which a second override gear unit engaged with the first override gear unit is formed on a first side, and a plurality of spline protrusions at least partially fitted into each of the spline groove portions are formed on a second side; and an elastic member located between the accommodation groove and the override ring member.

The first override gear unit may include a plurality of first groove portions spaced from each other in a circumferential direction of the worm wheel and concavely formed in an axial direction of the worm wheel, the second override gear unit may include a plurality of second protrusions spaced from each other in a circumferential direction of the override ring member and convexly formed in an axial direction of the override ring member to correspond to the first override gear unit, and the plurality of second protrusions may be respectively inserted into and engaged with the plurality of first grooves.

Both side walls of each of the first groove portions may include a first inclined surface and a second inclined surface, respectively, and both side surfaces of each of the second protrusions in a circumferential direction may include a third inclined surface formed to correspond to the first inclined surface, and a fourth inclined surface formed to correspond to the second inclined surface.

The first inclined surface may be formed to be inclined at a first angle, an obtuse angle, from a bottom surface of each of the first groove portions, and the second inclined surface may be formed to be inclined at a second angle, an obtuse angle, from the bottom surface of each of the first groove portions.

The first angle and the second angle may be different from each other.

A size of the first angle may be greater than a size of the second angle.

An external force applied to the override unit so that each of the second protrusions contacts and moves along the first inclined surface may be set to be smaller than external force applied to the override unit so that each of the second protrusions contacts and moves along the second inclined surface.

The override ring member may be movable relative to the worm wheel and/or the intermediate gear in a longitudinal direction of the shaft, and may be pushed toward the worm wheel by the elastic member.

When the sector gear of the column unit rotates by external force, the intermediate gear engaged with the sector gear may rotate, but the worm wheel may not rotate due to self-locking, and the second protrusion may be inserted into another adjacent first groove over one of the first inclined surface or the second inclined surface, so that the override ring member in the intermediate gear may rotate with respect to the worm wheel.

The housing may be fixed on a steering column in front of a steering wheel, the steering column may pass through the housing and one end portion of the column unit, and the column unit may rotate around the steering column when the driving unit operates, and may change a position thereof to a standby mode or a use mode.

The standby mode may be a position in which the column unit extends from the front of the steering wheel in an upward direction, and the use mode may be a position in which the column unit rotates from the standby mode and is located to extend in a lateral direction of the steering wheel.

External force applied to rotate the column unit from the standby mode toward the use mode may be set to be smaller than external force applied to rotate the column unit from the use mode toward the standby mode.

The housing may include a cover covering an accommodation space therein, and a plurality of stoppers limiting rotation of the column unit may be provided on the cover.

According to another aspect of the present disclosure, a shift control apparatus includes a housing located in front of a steering wheel; a column unit including one end portion rotatably coupled to the housing, protruding from the housing in a radial direction, and operable for shifting; a driving unit provided in the housing, and rotating the column unit according to a signal from an input unit; and an override unit provided in the driving unit to transmit driving force to the column unit, and enable the column unit to rotate when external force is applied, wherein the column unit may be located in a standby mode, a position extending from the front portion of the steering wheel in an upward direction, or a use mode, a position extending in a lateral direction of the steering wheel, the override unit may be configured to transmit driving force to the column unit so that the column unit rotates by operation of the driving unit to change a position thereof from the standby mode to the use mode or from the use mode to the standby mode, and the override unit may be configured to rotate the column unit when an external force is applied, to change a position thereof from the standby mode to the use mode or from the use mode to the standby mode.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
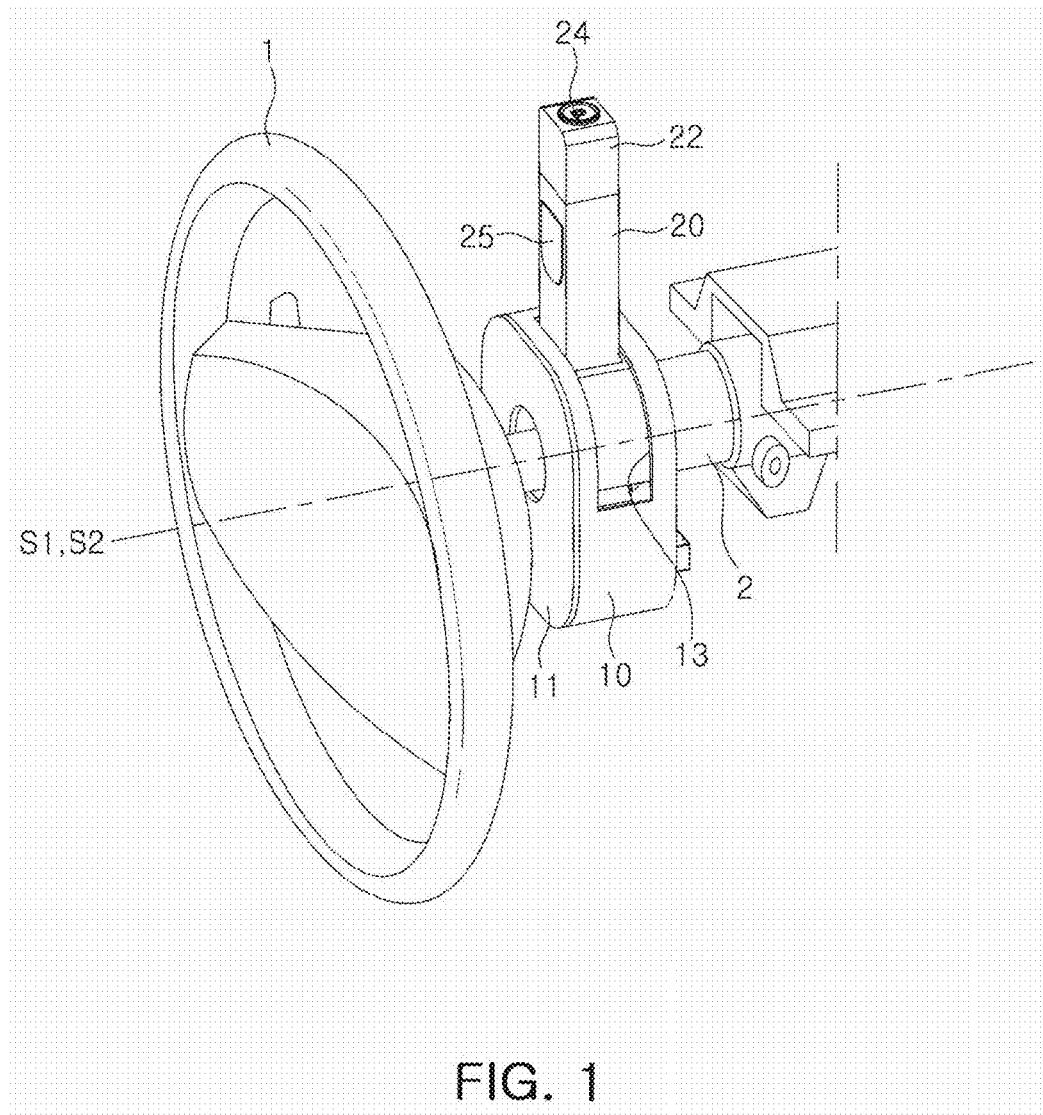
FIG. 1 is a view exemplarily illustrating an example in which a shift control apparatus according to an exemplary embodiment of the present disclosure is provided.

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be described in detail through example drawings. When adding reference numerals to components in each of the drawings, it should be noted that identical components are provided the same reference numerals as much as possible even if they are illustrated in different drawings.

In the present specification, a vehicle refers to a variety of vehicles that move a transported object, such as people, animals, goods, or the like, from a starting point to a destination. These vehicles are not limited to vehicles that run on roads or tracks.

In the present specification, terms such as first, second, third, fourth, or the like may be used to describe various components, but a sequence, sizes, locations, and degrees of importance of these components are not limited by terms such as first, second, third, fourth, or the like, and may be named only for distinguishing one component from other components.

Figure 2:
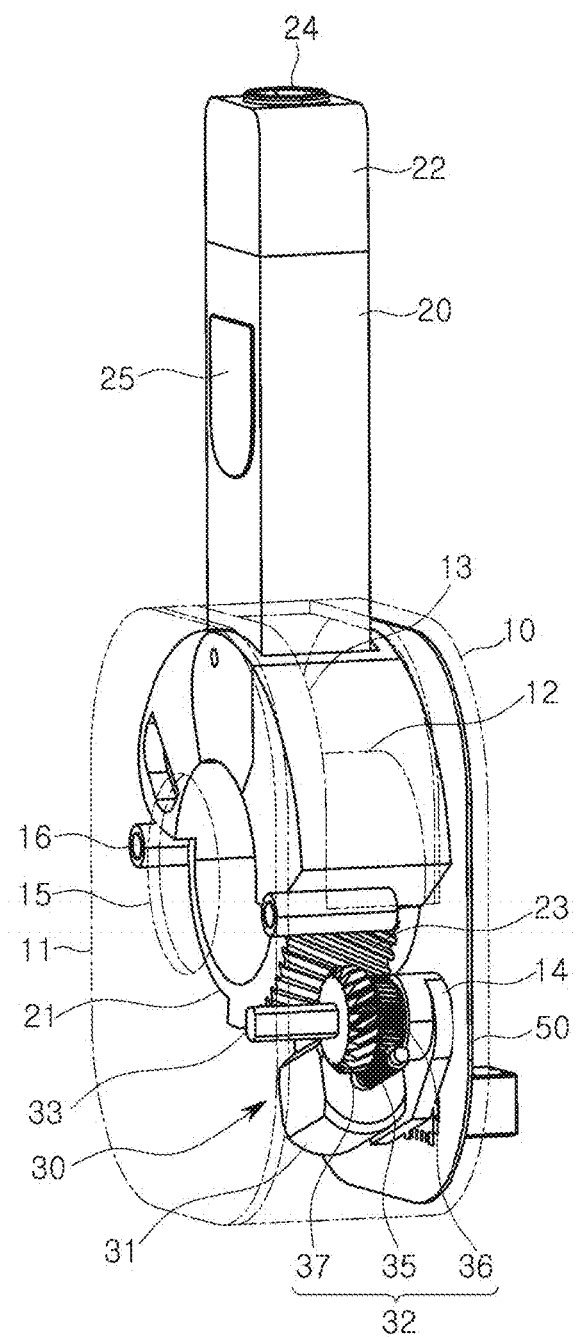
FIG. 2 is a perspective view of a shift control apparatus according to an exemplary embodiment of the present disclosure.
Figure 3:
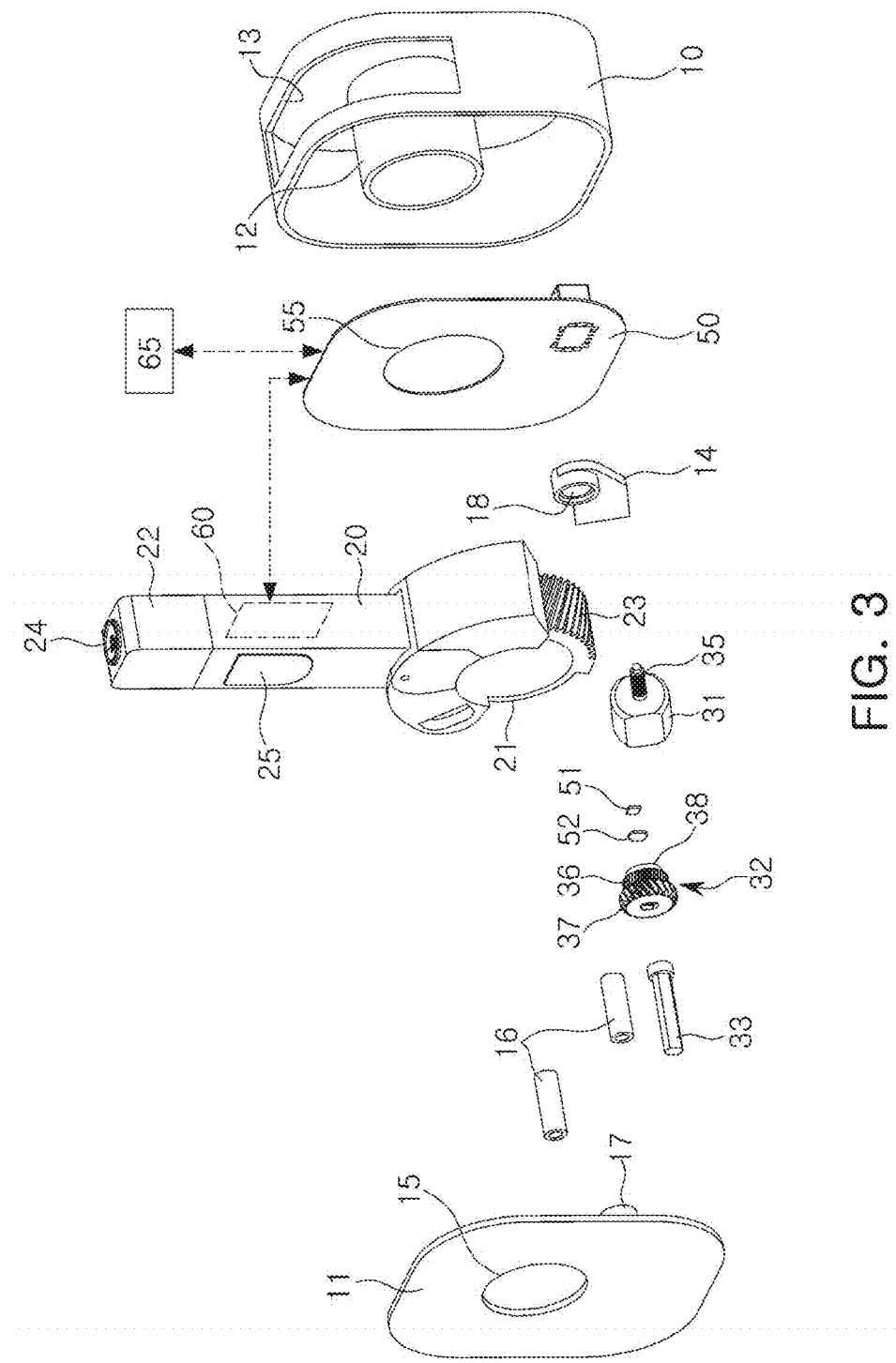
FIG. 3 is an exploded perspective view of a shift control apparatus according to an exemplary embodiment of the present disclosure.

FIG. 1 is a view exemplarily illustrating an example in which a shift control apparatus according to an exemplary embodiment of the present disclosure is provided, FIG. 2 is a perspective view of a shift control apparatus according to an exemplary embodiment of the present disclosure, and FIG. 3 is an exploded perspective view of a shift control apparatus according to an exemplary embodiment of the present disclosure.

A shift control apparatus according to an exemplary embodiment of the present disclosure may include a housing 10, a column unit 20, a driving unit 30, and an override unit 40.

As illustrated in FIG. 1, a shift control apparatus according to an exemplary embodiment of the present disclosure may be provided on a steering wheel 1 of a vehicle so that a driver may control shift of a gear stage through the column unit 20. This may have an advantage of not having to provide a separate space for arrangement of the shift control apparatus and the column unit.

A rotation axis S1 of the column unit 20 and a rotation axis S2 of the steering wheel 1, forming the shift control apparatus, may be arranged substantially concentrically.

A steering column 2 of the vehicle may pass through the housing 10 and one end portion of the column unit 20, and the housing may be fixed on the steering column 2 in a front of the steering wheel 1. Therefore, the column unit may rotate around the steering column.

In the present manner, when the steering column 2 passes through the one end portion of the column unit 20 and the column unit is provided to be rotatable with respect to the steering column, the rotation axis S1 of the column unit and the rotation axis S2 of the steering wheel 1 may be substantially coaxial with the steering column 2. In the instant case, layouts of the shift control apparatus and the column unit may be reduced.

The arrangement of the shift control apparatus is not necessarily limited to the example illustrated above, and for example, the steering column 2 may not pass through the one end portion of the column unit 20, and the housing 10 may be located outside the steering column.

For example, the rotation axis S1 of the column unit 20 and the rotation axis S2 of the steering wheel 1 may be spaced from each other and arranged in parallel. In the instant case, because the shift control apparatus and the column unit 20 may be provided in various positions as needed, there may be an advantage in that a degree of design freedom is improved.

The housing 10 may be a member including a box shape or a shape of cylinder, may include an accommodation space formed therein, and may include a cover 11 covering the accommodation space.

A shaft member 12 including a shape of a tube may be provided in the housing 10, and the one end portion of the column unit 20 may be fitted onto an external peripheral surface of the shaft member 12 so that the column unit may be rotatably coupled to an internal portion of the housing. For example, the shaft member may form the rotation axis S1 of the column unit.

Additionally, in the housing 10, a long hole 13 extending in a direction, surrounding the shaft member 12, may be formed in a side wall extending in a direction, parallel to the shaft member 12. The column unit 20 may be coupled to the shaft member while passing through the long hole and being inserted into the housing so that rotation thereof may be guided by the long hole 13, and a position thereof may be varied. As a result, the column unit may be disposed to protrude from the shaft member of the housing in a radial direction of the shaft member.

The driving unit 30 and the override unit 40 may be provided and accommodated in the accommodation space in the housing 10. Additionally, a support member 14 for mounting and supporting a motor forming the driving unit 30 may be provided in the accommodation space in the housing 10.

Additionally, a printed circuit board (hereinafter, referred to as a PCB) 50 may be built into the accommodation space in the housing 10. The PCB may form a controller that is configured to control the shift control apparatus or at least an operation of the driving unit 30.

An IC chip, a Hall sensor 51, and the like may be mounted on the PCB 50. The PCB may use a signal from the Hall sensor to detect rotation of the column unit 20 and control driving of the driving unit 30. Additionally, the PCB may be provided with a communication module and may communicate with a high rank control system and/or a transmission control unit 60 in the vehicle via wired communications, wireless communications, or wired/wireless communications.

The PCB 50 may detect a position of the column unit 20 by the Hall sensor 51, and accordingly, it is possible to know whether the column unit is properly located in a standby mode or a use mode.

Additionally, the PCB 50 may be configured for controlling driving of the driving unit 30 using the signal from the Hall sensor 51, and may further control rotation of the column unit 20. Because of this, the column unit may rotate from the standby mode to the use mode, or from the use mode to the standby mode, changing a position thereof.

The housing 10 may be fixedly coupled to the steering column 2, for example, as described above. An internal portion of the shaft member 12 in the housing may communicate with an external portion of the housing, and the cover 11 and the PCB 50 may include a through-hole 15 and a through-hole 55, formed at positions corresponding to the shaft member, respectively.

As a result, the steering column 2 may pass through the housing 10, the shaft member 12, the PCB 50, the one end portion of the column unit 20, the cover 11, and the like. The housing 10 may be fixed to the steering column 2, for example by bolting or the like, with the steering column passing therethrough.

The cover 11 may be a member including a plate shape, and a plurality of stoppers 16 limiting rotation of the column unit 20 around the through-hole 15 may be provided on an internal side surface facing the accommodation space of the housing 10. Additionally, a support hole 17 formed to support an end portion of a shaft 33 forming the driving unit 30 may be provided in the cover 11.

The column unit 20 may be a member including a column shape and a hollow portion, and may include an annular portion 21 formed on one end portion and a shift knob 22 disposed on the other end portion thereof.

The annular portion 21 may be fitted and rotatably coupled to the shaft member 12 having a tubular shape in the housing 10, allowing the column unit 20 to rotate inside and outside the housing.

A sector gear 23 including a plurality of teeth may be formed on one side of an external peripheral surface of the annular portion 21. As the sector gear 23 engages with a gear unit 32 forming the driving unit 30, the annular portion 21 and the column unit 20 may rotate according to rotation of the gear unit. The annular portion and the sector gear may be molded integrally with the column unit, but are not necessarily limited thereto.

The shift knob 22 may be provided to rotate around a longitudinal axis of the column unit 20. In a use mode, for example, around the longitudinal axis of the column unit 20, when the driver rotates the shift knob in one direction (e.g., clockwise), a D stage may be executed, and when the driver rotates the shift knob in a reverse direction (e.g., counterclockwise), an R stage may be executed. Arrangement of a gear stage is not necessarily limited thereto, and for example, the D stage and the R stage may be arranged oppositely, or a different stage may be placed.

In the shift knob 22, an intermediate position between the D and R stages may be the initial position (null stage) that does not generate a specific shift signal, and the shift knob may self-return to the initial position after shifting to the D or R stage. Furthermore, a P-stage button 24 may be separately provided in an end portion of the shift knob so that a vehicle may be parked by operating the P-stage button by the driver.

A configuration and an operation of the shift knob 22 may not be limited to the above-described examples. For example, a toggle-type shift knob may be provided to rotate about an axis line, parallel to the rotation axis S1 of the column unit 20. In the use mode, when the driver rotates the shift knob in one direction (for example, clockwise) around the axis line, parallel to the rotation axis S1 of the column unit 20, the D stage may be executed, and when the driver rotates the shift knob in a reverse direction (for example, counterclockwise), the R stage may be executed.

Optionally, the column unit 20 may further include an indicator 25 disposed adjacent to the shift knob 22. For example, when the column unit is disposed in the use mode, the indicator may display the gear stage of the vehicle, and when the column unit 20 is located in a standby mode, the indicator may display visual information images other than the gear stage.

In the instant case, the visual information images other than the gear stage may include one or more of a welcome image, a good-bye image, an autonomous driving activation image, and a driving assistance device activation image.

In the present manner, the indicator 25 may display a current state of the vehicle in various conditions as the visual information images to notify the driver, improving marketability of the vehicle, together with the shift control apparatus.

Furthermore, the column unit 20 may further include a transmission control unit 60 detecting a change in gear stage by operating the shift knob 22 and is configured to control a driving device of a transmission. The transmission control unit may be provided in the column unit and may be electrically connected to the PCB 50 in the housing 10 through communications. Alternatively, the transmission control unit may be provided on the PCB 50 in the housing 10.

Depending on a signal received from the PCB 50, the transmission control unit 60 may be configured to display the visual information images other than the gear stage on the indicator 25 in the standby mode, and may be configured to display the gear stage of the vehicle on the indicator in the use mode.

The driving unit 30 may include a motor 31 fixed in the housing 10 via the support member 14, a gear unit 32 transmitting driving force of the motor to the column unit 20, and a shaft 33 rotating and supporting at least a portion of the gear unit.

The motor 31 may be, for example, a servo motor, a step motor, or the like, configured for rotating in forward and reverse directions. Driving of the motor 31 may be controlled by the PCB 50. Therefore, the column unit 20 may rotate clockwise or counterclockwise.

The support member 14 may be fixed in the housing 10, and the motor 31 may be fixed on one side of the support member 14. A support hole 18 may be formed in an end portion of the one side of the support member 14 to support the gear unit 32 and the shaft 33.

Figure 4:
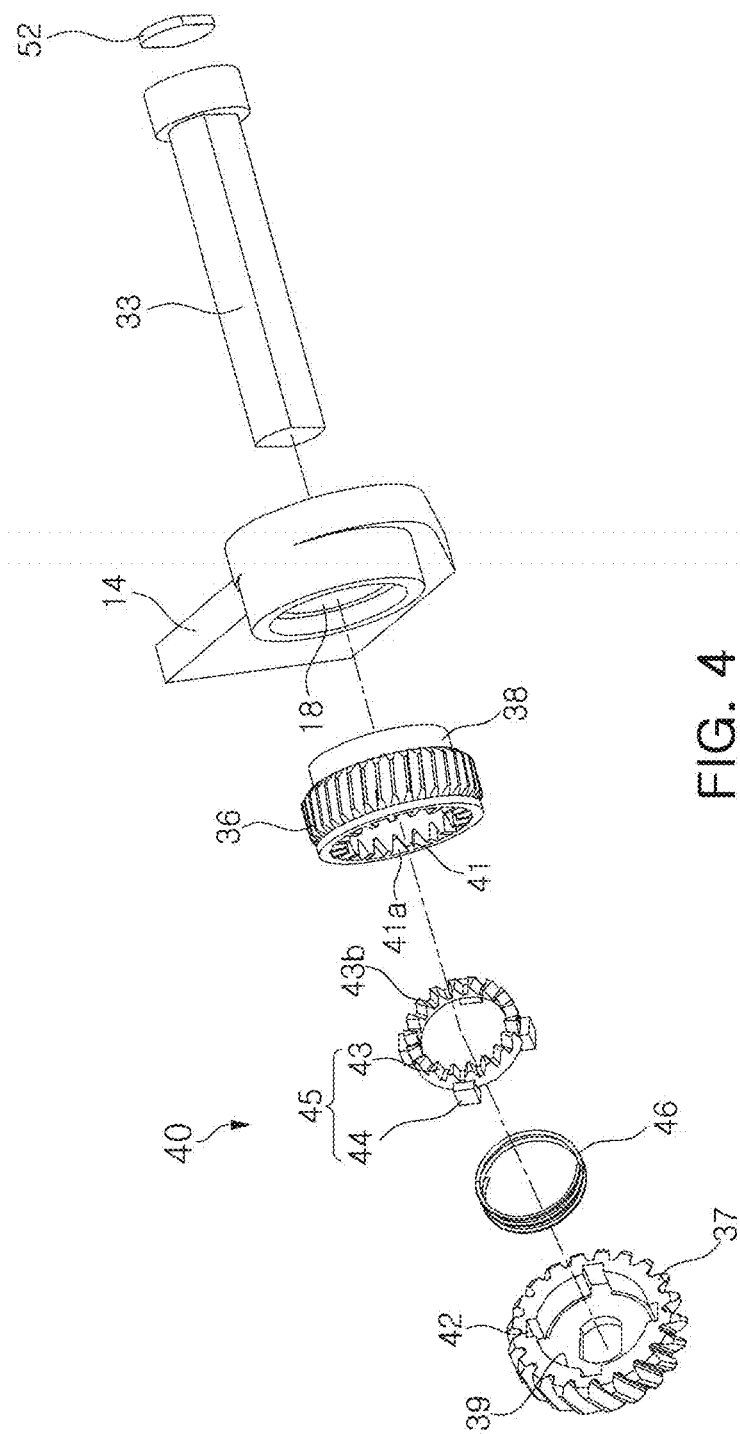
FIG. 4 is an exploded perspective view exemplarily illustrating a gear unit and an override unit of the shift control apparatus according to an exemplary embodiment of the present disclosure illustrated in FIG. 3.
Figure 5:
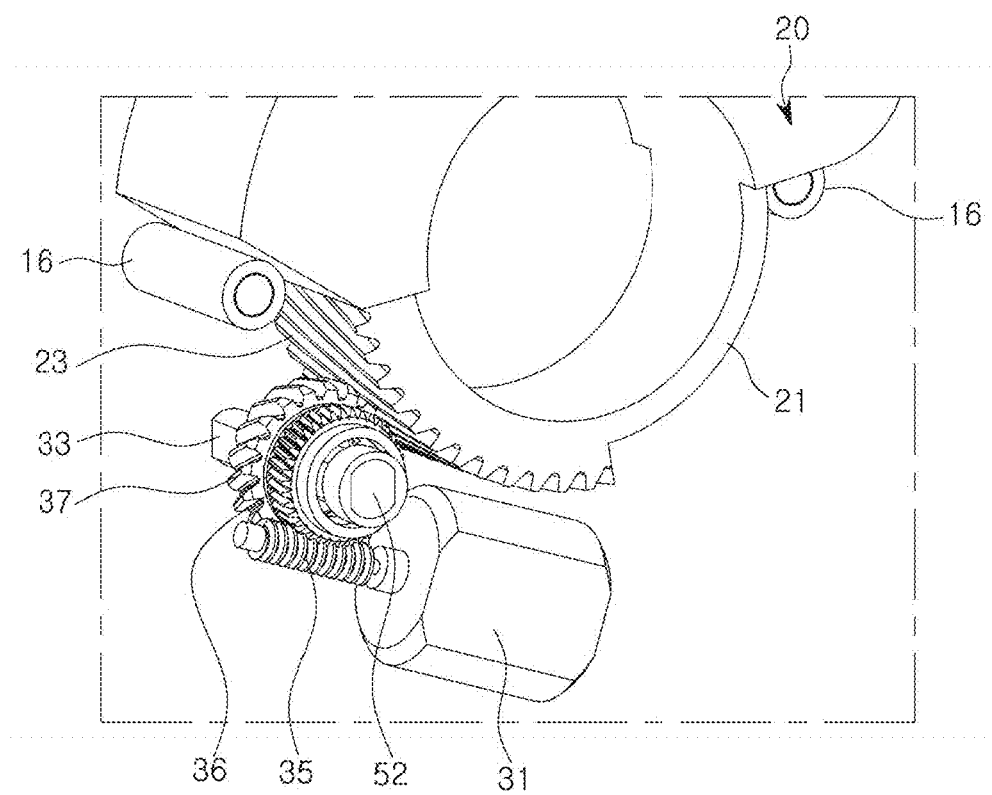
FIG. 5 is an enlarged perspective view exemplarily illustrating a driving unit of a shift control apparatus according to an exemplary embodiment of the present disclosure.

FIG. 4 is an exploded perspective view exemplarily illustrating a gear unit and an override unit of the shift control apparatus according to an exemplary embodiment of the present disclosure illustrated in FIG. 3, and FIG. 5 is an enlarged perspective view exemplarily illustrating a driving unit of a shift control apparatus according to an exemplary embodiment of the present disclosure.

The gear unit 32 may include a worm 35 mounted on a motor axis of the motor 31, a worm wheel 36 having an annular shape and engaged with the worm 35, an intermediate gear 37 mounted on the shaft 33 and arranged coaxially with the worm wheel, and an override unit 40 connecting the worm wheel 36 and the intermediate gear 37.

The worm wheel 36 may be rotatably supported in the support hole 17 of the support member 14 by a stepped portion 38 formed on one edge portion of an internal surface, and the shaft 33 passes through the annular worm wheel, but may be disposed to rotate relatively, without being fixed to the worm wheel.

The intermediate gear 37 may be fixedly mounted on the shaft 33, and a spur gear or a helical gear may be employed as the intermediate gear. The intermediate gear 37 may be engaged with the sector gear 23 formed on the annular portion 21 of the column unit 20. FIG. 2 and FIG. 3 illustrate an intermediate gear, which may be a helical gear, and a sector gear, which may be formed in a spiral shape corresponding thereto, but is not necessarily limited thereto.

Furthermore, an accommodation groove 39 concavely formed in an axial direction (i.e., thickness direction) of the intermediate gear 37 may be provided on one side surface of the intermediate gear 37, and may accommodate the override unit 40.

One end portion of the shaft 33 may be supported by the support hole 18 of the support member 14, and the other end portion thereof may be supported by the support hole 17 formed in the cover 11 of the housing 10. The shaft may pass through the worm wheel 36, the intermediate gear 37, and the override unit 40, and may be fixed to the intermediate gear to rotate together with the intermediate gear.

Therefore, driving force of the motor 31 may be transmitted to the worm 35, the worm wheel 36, the override unit 40, the intermediate gear 37, and the sector gear 23 of the annular portion 21, to achieve rotation of the column unit 20.

A permanent magnet 52 may be fixed on one side of an end portion of the shaft 33. The Hall sensor 51 of the PCB 50 in the housing 10 may detect rotation of the column unit 20 through a change in magnetic flux of the permanent magnet 52 due to the rotation of the gear unit 32 and the shaft 33.

A self-locking function may be achieved by the gear unit 32 employing the worm 35 and the worm wheel 36. Due to the self-locking, when driving of the motor 31 stops, the worm may stop without rotating even when external force is transmitted to the worm wheel. As a result, the position of the column unit 20 may be fixed in the standby mode or the use mode.

In a shift control apparatus according to an exemplary embodiment of the present disclosure, when the column unit 20 cannot rotate using the driving force of the motor due to a failure of the motor 31, the PCB 50, or the like, the driver may forcibly manually rotate the column unit. This may be called an override function.

The override unit 40 provided for the present function, in addition to the override function, may act as a medium connecting the worm wheel 36 and the intermediate gear 37, when the column unit 20 rotate by the driving force of the motor 31, to transmit the driving force of the motor to the column unit, and conversely, when external force is applied to the intermediate gear through the column unit, may act as absorbing the external force not to be transmitted to the motor.

The override unit 40 may include a first override gear unit 41 formed on an edge portion of the other side of an internal surface of the worm wheel 36, a plurality of spline groove portions 42 formed on an internal surface of a side wall in the accommodation groove 39 of the intermediate gear 37, an override ring member 45 including a second override gear unit 43 formed on one side and a plurality of spline protrusions 44 formed on the other side, and an elastic member 46 located between the accommodation groove of the intermediate gear and the override ring member.

The first override gear unit 41 may include a plurality of first groove portions 41a spaced from each other on the other edge portion of the worm wheel 36 at regular intervals in a circumferential direction and concavely formed in an axial direction (i.e., thickness direction) of the worm wheel. Since a first protrusion 41b may be located between a pair of adjacent first groove portions, the plurality of first groove portions and a plurality of first protrusions may be alternately and continuously arranged in the first override gear unit.

Optionally, the first override gear unit 41 may be formed to be engraved so that the plurality of first protrusions 41b do not protrude in an axial direction from the edge portion of the worm wheel, but the present disclosure is not limited thereto.

The second override gear unit 43 located on one side of the override ring member 45 may include a plurality of second protrusions 43b spaced from each other at regular intervals in a circumferential direction on one side surface of the override ring member to correspond to the first override gear unit 41 and formed convexly in the axial direction (i.e., thickness direction) of the override ring member 45. Since a second groove portion 43a may be located between a pair of adjacent second protrusions, the plurality of second protrusions and a plurality of second groove portions may be alternately and continuously arranged in the second override gear unit.

Since the override ring member 45 may be pushed toward the worm wheel 36 by elastic force of the elastic member 46, the plurality of second protrusions 43b of the second override gear unit 43 may be respectively fitted into and engaged with the plurality of first groove portions 41a of the first override gear unit 41 so that the worm wheel and the override ring member may be in a connection state configured for transmitting power to each other.

The plurality of spline groove portions 42 may be spaced apart at predetermined intervals in a circumferential direction of the internal surface of the side wall in the accommodation groove 39 of the intermediate gear 37, and may be formed to be concave in a radial direction thereof. The plurality of spline protrusions 44 located on the other side of the override ring member 45 may be formed to protrude, in an axial direction, from the edge portion of the other side of the override ring member and to protrude, in a radial direction, from an external peripheral surface. A plurality of spline groove portions and a plurality of spline protrusions may be formed in the same number.

Even though the elastic member 46 is located between the override ring member 45 and the intermediate gear 37, the plurality of spline protrusions 44 may be at least partially inserted into the plurality of spline groove portions 42, respectively, to couple the override ring member and the intermediate gear, and thereby the override ring member and the intermediate gear may rotate integrally.

The override ring member 45 may relatively move in the longitudinal direction of the shaft 33 with respect to the worm wheel 36 and/or the intermediate gear 37. After being moved, the override ring member may be pushed toward the worm wheel by the elastic force of the elastic member 46, as described above. In the instant case, a coil spring may be employed as the elastic member, but the present disclosure is not necessarily limited thereto.

A shift control apparatus according to an exemplary embodiment of the present disclosure may be characterized in that a first inclined surface 41s (see FIGS. 7 and 8) and a second inclined surface 41t (see FIGS. 7 and 8), respectively, are provided on both side walls of the first groove portion 41a, and a third inclined surface 43s (see FIGS. 7 and 8) corresponding to the first inclined surface and a fourth inclined surface 43t (see FIGS. 7 and 8) corresponding to the second inclined surface, respectively, are provided on both side surfaces of the second protrusion 43b in a circumferential direction thereof.

As a result, the first groove portion 41a may include a trapezoidal cross-sectional shape in which a distance between both the side walls decreases in a depth direction, and as a result, the first protrusion 41b formed between the pair of first groove portions may also include a trapezoidal cross-sectional shape.

For example, the first inclined surface 41s may be formed to be inclined at a first angle $\alpha$ exceeding 90 degrees from a bottom surface of the first groove portion 41a, i.e., an obtuse first angle. For example, the second inclined surface 41t may be formed to be inclined at a second angle $\beta$ exceeding 90 degrees from the bottom surface of the first groove portion, i.e., an obtuse second angle.

Likewise, the second protrusion 43b corresponding to the first groove portion 41a may include the same cross-sectional shape as the first groove portion, and as a result, the second groove portion 43a formed between the pair of second protrusions may also include a trapezoidal cross-sectional shape.

In the first groove portion 41a, the first angle $\alpha$ of the first inclined surfaces 41s and the second angle $\beta$ of the second inclined surfaces 41t may be different from each other. Additionally, correspondingly, an angle of the third inclined surface 43s and an angle of the fourth inclined surfaces 43t in the second protrusion 43b may be different from each other. For example, in the first groove portion 41*a*, a size of the first angle α may be set to be greater than a size of the second angle β.

When the first angle α of the first inclined surface 41*s* and the second angle β of the second inclined surface 41*t* are set to be different from each other in the first groove portion 41*a*, there may be an advantage that intensity of external force that should be applied for the override function may be applied differently depending on a rotation direction of the column unit 20, e.g., an override direction.

When the second protrusion 43*b* is inserted into the first groove portion 41*a*, the first inclined surface 41*s* and the third inclined surface 43*s* may be in contact with each other, and the second inclined surface 41*t* and the fourth inclined surface 43*t* may be in contact with each other. In in the instant state, when driving force of the motor 31 is transmitted to the override ring member 45 through the worm 35 and the worm wheel 36, the override ring member may rotate in a first direction (e.g., clockwise) or in a second direction (e.g., counterclockwise), opposite to the first direction, and a rotation force of the override ring member may be transmitted to the intermediate gear 37 due to engagement of the plurality of first groove portions 41*a* and the plurality of second protrusions 43*b*.

As the intermediate gear 37 rotates, the column unit 20 may rotate, together with the sector gear 23 of the annular portion 21 engaged therewith. In the instant case, the shaft 33 fixed to the intermediate gear may also rotate so that the Hall sensor 51 of the PCB 50 in the housing 10 may detect rotation of the column unit by a change in magnetic flux of the permanent magnet 52 by rotation of the shaft.

In a state in which the second protrusion 43*b* is inserted into the first groove portion 41*a* and the first inclined surface 41*s* and the third inclined surface 43*s* are in contact with each other, and the second inclined surface 41*t* and the fourth inclined surface 43*t* are in contact with each other, when the sector gear 23 of the annular portion 21 rotates, together with the column unit 20, by a predetermined amount of external force, the intermediate gear 37 engaged with the sector gear may rotate in the first or second direction, but the worm wheel 36 and the worm 35 may not rotate due to self-locking.

Therefore, any one of the third inclined surface 43*s* or the fourth inclined surface 43*t* of the second protrusion 43*b* may move along any one of the first inclined surface 41*s* or the second inclined surface 41*t*, in contact, in the first groove portion 41*a*, and thereby the override ring member 45 may overcome the elastic force of the elastic member 46 to move toward the intermediate gear 37 in the longitudinal direction of the shaft 33.

After the second protrusion 43*b* comes out of the first groove portion 41*a*, the override ring member 45 may rotate in the rotation direction of the intermediate gear 37, and therefore, the second protrusion may move in the circumferential direction, and may be inserted into a different first groove portion adjacent to the first groove portion by the elastic force of the elastic member 46.

Such a series of processes may be repeated until the external force is sufficiently absorbed, and thereby, the intermediate gear 37 may rotate relative to the worm wheel 36 when the external force is applied. As a result, a shift control apparatus according to an exemplary embodiment of the present disclosure may implement an override function.

FIG. 6 is a view exemplarily illustrating a state in which a column unit is in a standby mode and a use mode by operation of a shift control apparatus according to an exemplary embodiment of the present disclosure.

Figures 6A, 6B:
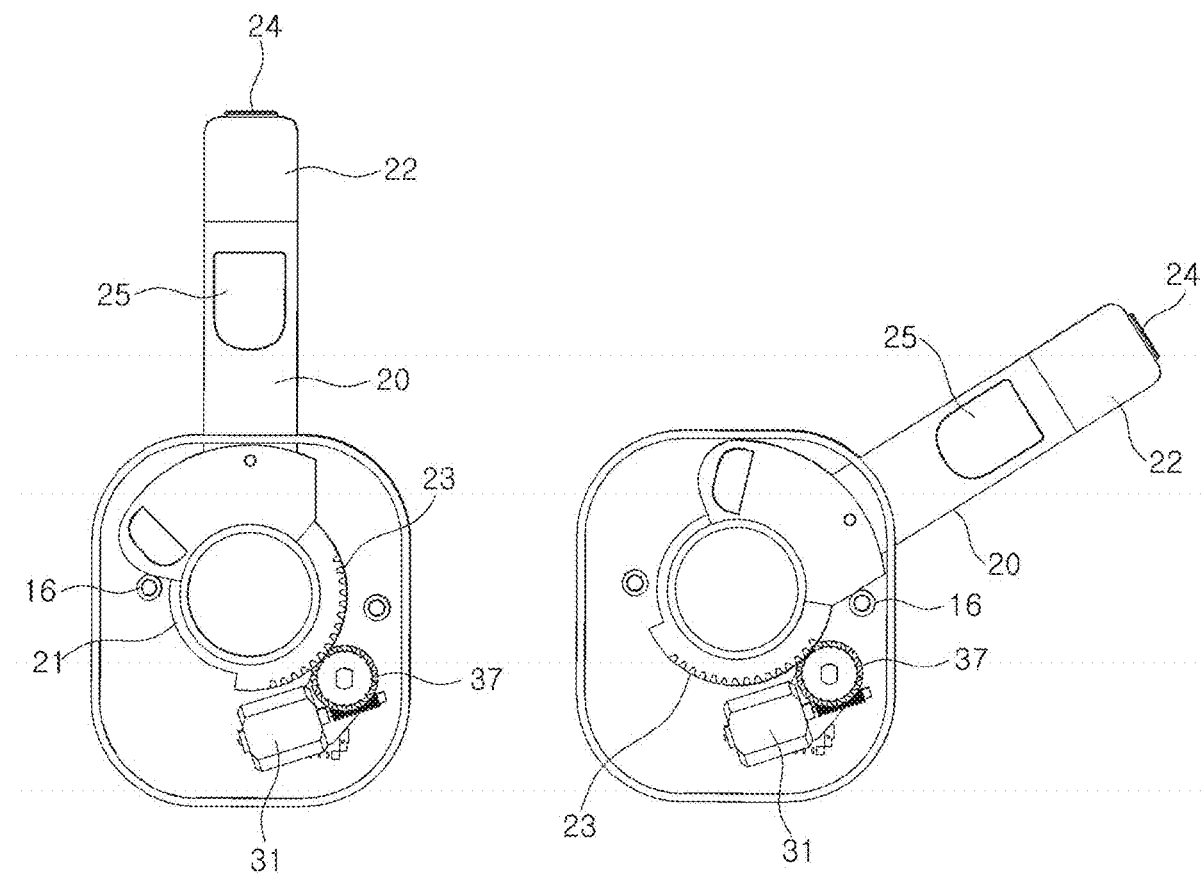
FIG. 6A and FIG. 6B are views exemplarily illustrating a state in which a column unit is in a standby mode and a use mode by operation of a shift control apparatus according to an exemplary embodiment of the present disclosure.

A column unit 20 may rotate around a steering column 2 when a driving unit 30 operates, and a position thereof may be changed between a standby mode and a use mode depending on rotation. FIG. 6A illustrates the column unit in the standby mode, and FIG. 6B illustrates the column unit in the use mode.

For example, the standby mode may be defined as a position in which the column unit 20 extends upward in front of a steering wheel 1, based on a perspective of a driver, and the use mode may be defined as a position in which the column unit rotates from the standby mode and is disposed to extend laterally.

For example, the standby mode may be in a position in which the column unit 20 extends in a 12 o'clock direction, and the use mode may be in a position in which the column unit extends in approximately 2 o'clock or 10 o'clock direction.

A change in position between the standby mode and the use mode of the column unit 20 may be implemented by operating the driving unit 30, and a change in position from the standby mode to the use mode is desirable to set the same at 90 degrees or lower to prevent the column unit from interfering with the driver's knee.

The column unit 20 may rotate in one direction (e.g., clockwise) from the standby mode to change a position thereof to the use mode, by operating the driving unit 30, and may return from the use mode to the standby mode by rotating in a reverse direction.

In the present manner, the column unit 20 may be located to extend upward in the standby mode so that when the driver gets on the vehicle, the column unit may be located at the front which the driver's gaze is directed, to easily transmit visual information images other than the gear stage indicated by an indicator 25 to the driver, generating a sense of aesthetics.

Additionally, in the use mode, the column unit 20 may be located to extend laterally so that the driver may easily change the gear stage by easily holding a shift knob 22 provided on the column unit.

When a printed circuit board (PCB) 50 forming a controller of the shift control apparatus receives a signal from an input unit 65, it may be configured for controlling to drive a motor 31 of the driving unit 30 to change a position of the column unit 20. In the instant case, the input unit may include a high rank control system and a different controller of the vehicle, various sensors of the vehicle, or the like.

The signal of the input unit 65 may be any one of a start-on signal and a start-off signal of the vehicle, an open signal and a close signal of a door, a lock signal and an unlock signal of the door, an entry signal of an autonomous driving mode, or a change signal of a driver mode.

For example, the column unit 20 may be located in the standby mode when the vehicle is started off, and may be located in the use mode when the vehicle is started on. by changing a position of the column unit, the driver may clearly recognize whether the vehicle is starting or not.

In the instant case, starting may include not only a driving state of an internal combustion engine, but also the driving preparation (e.g., 'READY') state of the electric vehicle.

When a start-on signal is received, a welcome image may be displayed on the indicator 25 of the column unit 20. This may allow the driver to clearly recognize whether the vehicle is starting or not. In the electric vehicle, effectively informing the driver that the vehicle has started may be improved.

Additionally, the column unit 20 may be located in the standby mode when an open signal of the door is received, and may be located in the use mode when a close signal of the door is received. Additionally, the column unit may be located in the standby mode when a unlock signal of the door is received, and may be located in the use mode when a lock signal of the door is received.

Even in the open signal or the unlock signal of the door, a welcome image may be displayed on the indicator 25 of the column unit 20, providing aesthetic satisfaction to the driver.

Additionally, the column unit 20 may be located in the standby mode in the autonomous driving mode, and may be located in the use mode in the driver mode. In the autonomous driving mode, the vehicle may be in a driving state, but the column unit may be in the standby mode, and in the instant case, an autonomous driving activation image may be displayed on the indicator 25 to improve awareness of entering the autonomous driving mode.

As illustrated in FIG. 6A, when the column unit 20 is located in the standby mode, the vehicle may be in a start-off state or may be in an autonomous driving state. Therefore, in the instant case, even when the driver operates the shift knob 22 of the column unit, it is impossible to change the gear stage for safety reasons.

Exceptionally, when the shift knob 22 or a P-stage button 24 of the column unit 20 may be operated for a certain time period immediately after the vehicle is started off for parking, a shift signal to an N stage or a P stage may be transmitted.

As illustrated in FIG. 6B, when the column unit 20 is located in the use mode, the driver may change the gear stage by operation of rotating or toggling the shift knob 22.

For example, when the driver operates the shift knob 22, the transmission control unit 60 may detect a change in the gear stage, and may transmit detected information to the PCB 50, and the PCB may transmit the information to a control system of the vehicle, to perform shifting. When the shift is completed, the control system of the vehicle may transmit a shift completion signal to the PCB 50, and the PCB may transmit shift completion information the transmission control unit 60, and finally, the indicator 25 may display changed information on the gear stage by the transmission control unit.

In the present manner, a shift control apparatus according to an exemplary embodiment of the present disclosure may allow the driver to easily recognize a current state of the vehicle under various conditions by changing a position between the standby mode and the use mode, and may display a visual information image on the indicator 25 to notify the driver, to provide a high-tech image. Therefore, there may be an advantage of improving marketability of the vehicle along with the shift control apparatus.

Moreover, in a shift control apparatus according to an exemplary embodiment of the present disclosure, when the column unit 20 cannot rotate using the driving force of the motor due to a failure of the motor 31, the PCB 50, or the like, e.g., the driving unit cannot automatically rotate the column unit from the standby mode to the use mode, the driver may forcibly rotate the column unit from the standby mode to the use mode manually without operating the driving unit 30.

Figure 7:
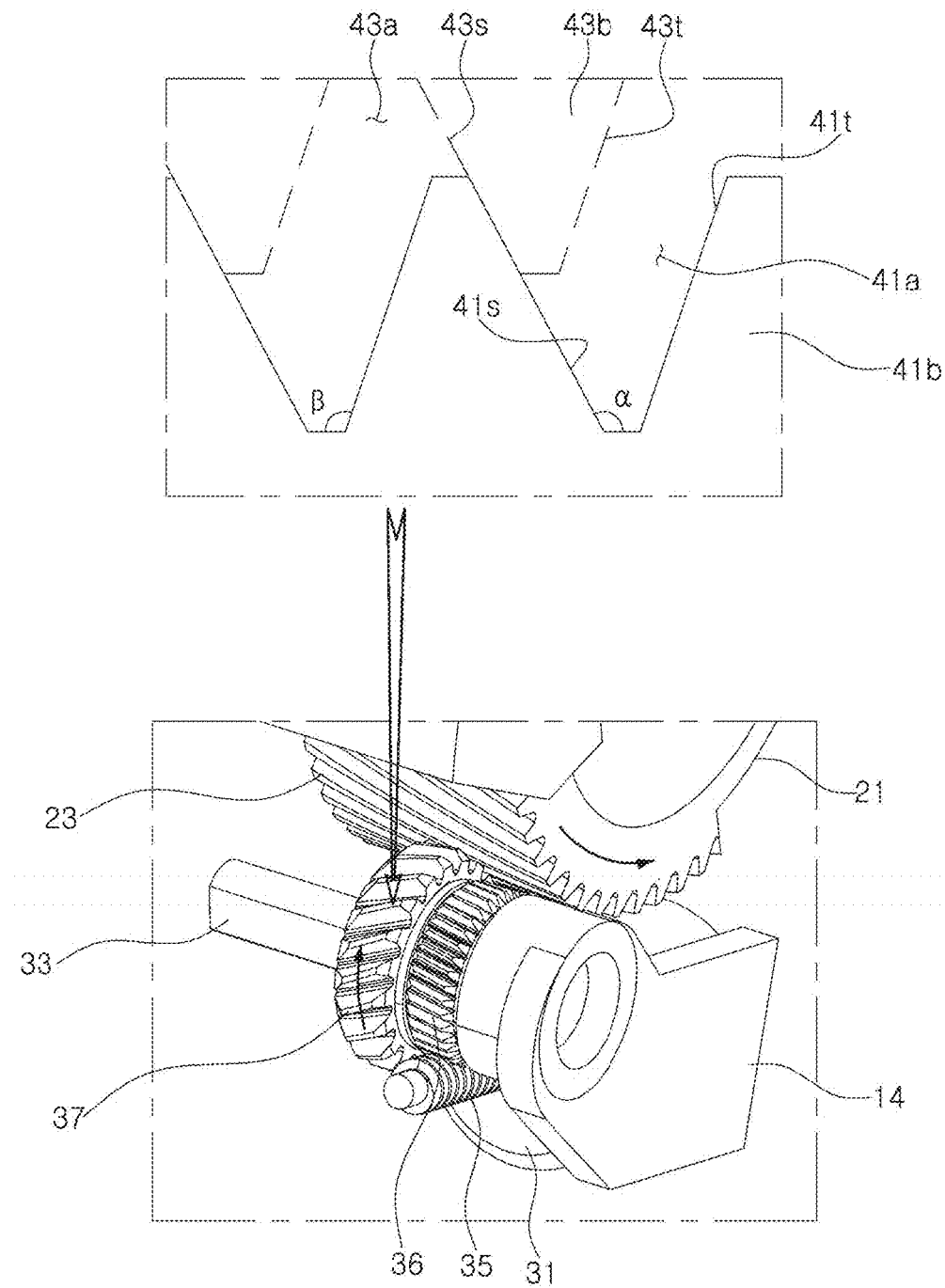
FIG. 7 and FIG. 8 are views exemplarily illustrating an operation of an override unit when external force is applied to a column unit of a shift control apparatus according to an exemplary embodiment of the present disclosure.

As illustrated in FIG. 7, when a sector gear 23 of the annular portion 21, together with the column unit 20, rotates in a first direction (e.g., clockwise from a perspective of the driver) due to external force applied by the driver, an intermediate gear 37 engaged with the sector gear may rotate in the second direction, but a worm wheel 36 may not rotate due to self-locking.

Therefore, a second inclined surface 43s on either side of a second protrusion 43b may move along a first inclined surface 41s, in contact, in a first groove portion 41a, and thereby an override ring member 45 may overcome elastic force of an elastic member 46 to move toward the intermediate gear 37 in a longitudinal direction of the shaft 33.

After the second protrusion 43b comes out of the first groove portion 41a, the override ring member 45 may rotate in a rotation direction of the intermediate gear 37, e.g., in a second direction, and therefore, the second protrusion may move in a circumferential direction, and may be inserted into a different first groove portion adjacent to the first groove portion by the elastic force of the elastic member 46.

Such a series of processes may be repeated until the external force is sufficiently absorbed, and thereby, the intermediate gear 37 may rotate relative to the worm wheel 36 when the external force is applied.

When the column unit 20 rotates, the second protrusion 43b of the second override gear unit 43 rides over the first protrusion 41b of the first override gear unit 41 to be inserted into the first groove portion 41a, and at the same time, the override ring member 45 moves toward the worm wheel 36 in the longitudinal direction of the shaft 33 by the elastic force of the elastic member 46. Whenever this happens, the driver may feel a sense of restrained movement.

The shaft 33 may be fixed to the intermediate gear 37 to rotate integrally with the intermediate gear, and the Hall sensor 51 of the PCB 50 in the housing 10 may detect rotation of the column unit 20 through a change in magnetic flux of the permanent magnet due to the rotation of the shaft 33.

When the driver rotates the column unit 20 to a position in the use mode, further rotation of the column unit may be prevented by a stopper 16 provided on one side of a cover 11 of the housing 10, and whether the column unit has normally reached the position in the use mode by override may be confirmed by detecting by the Hall sensor 51.

Furthermore, a shift control apparatus according to an exemplary embodiment of the present disclosure, in addition to an override function, may act as absorbing the external force not to be transmitted to the motor 31 of the driving unit 30, when an abnormal external force is applied to the intermediate gear 37 through the column unit while the column unit 20 is in the use mode.

Figure 8:
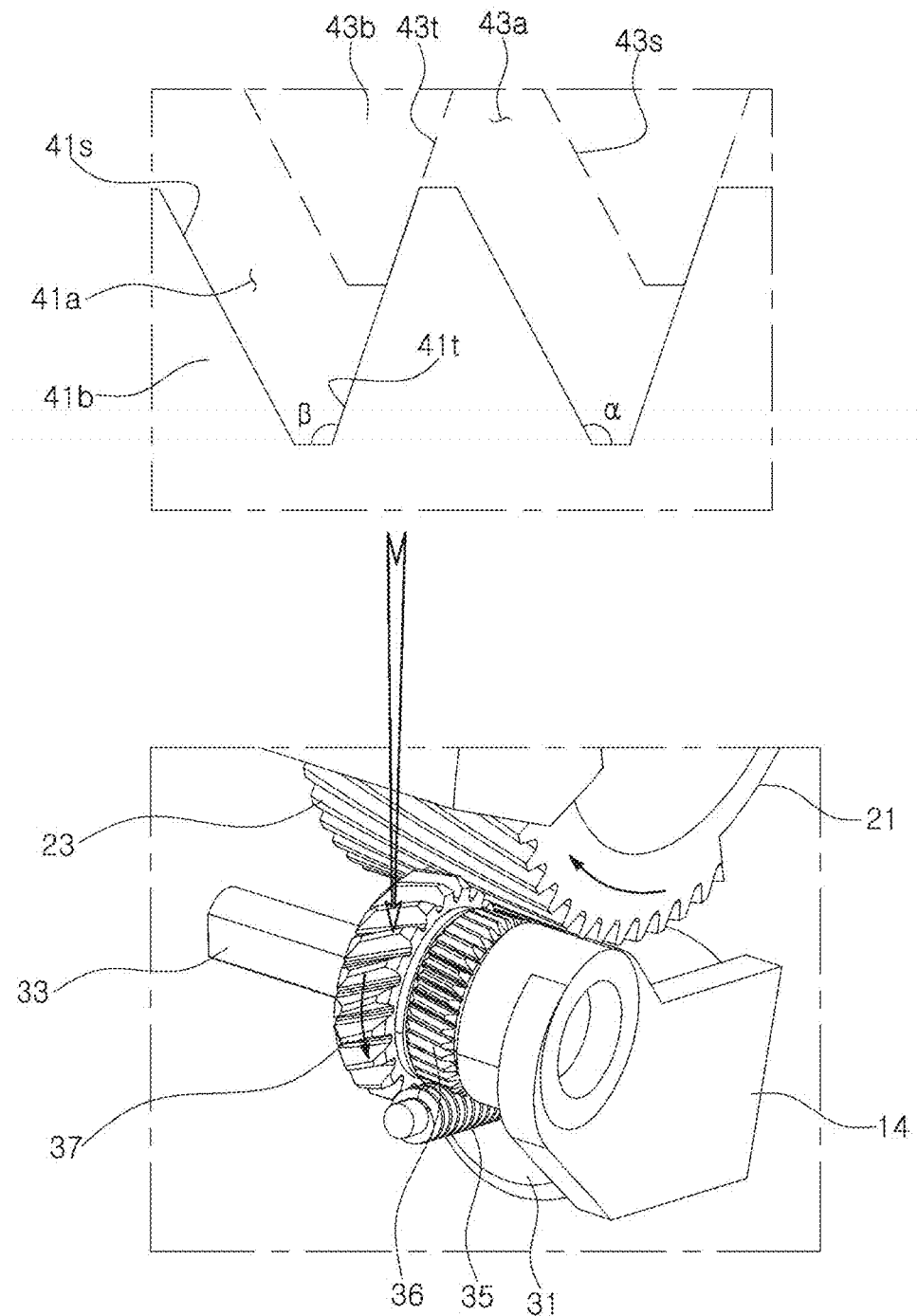

As illustrated in FIG. 8, when a strong external force is applied by the driver or any object, to rotate the sector gear 23 of the annular portion 21 along with the column unit 20 in the second direction (e.g., counterclockwise based on a perspective of the driver), the intermediate gear 37 engaged with the sector gear may rotate in the first direction, but the worm wheel 36 may not rotate due to self-locking.

Therefore, the second inclined surface 43s on the other side of the second protrusion 43b may move along the first inclined surface 41s, in contact, in the first groove portion 41a, and thereby the override ring member 45 may overcome the elastic force of the elastic member 46 to move toward the intermediate gear 37 in the longitudinal direction of the shaft 33.

After the second protrusion 43b comes out of the first groove portion 41a, the override ring member 45 may rotate in the rotation direction of the intermediate gear 37, e.g., in the first direction, and therefore, the second protrusion may move in the circumferential direction, and may be inserted into a different first groove portion adjacent to the first groove portion by the elastic force of the elastic member 46.

Such a series of processes may be repeated until the external force is sufficiently absorbed, and thereby, the intermediate gear 37 may rotate relative to the worm wheel 36 when the external force is applied.

The shaft 33 may be fixed to the intermediate gear 37, and may rotate integrally with the intermediate gear, and the Hall sensor 51 of the PCB 50 in the housing 10 may detect rotation of the column unit 20 through a change in magnetic flux of the permanent magnet 52 due to rotation of the shaft.

In the present manner, external force may be absorbed while rotating the column unit 20 from the use mode to the standby mode by a predetermined angular displacement, preventing damage to the column unit or the gear unit 32.

Intensity of the applied external force may be set differently by forming groove portions and/or protrusions by varying angles of the inclined surfaces on both sides depending on an override direction. As an inclination angle (obtuse angle) becomes smaller, intensity of the external force that should be applied to exercise the override function will increase.

In a shift control apparatus according to an exemplary embodiment of the present disclosure, when the column unit 20 does not rotate normally due to a rotation failure, and the driver applies external force to the column unit from the standby mode to the use mode, the column unit may rotate to be properly located in the use mode without depending on an operation of the driving unit 30.

As a result, even when the driving unit fails, the driver may manually rotate the column unit so that the column unit 20 may be properly located in the use mode, and the driver may control shift of a gear stage by operating the shift knob 22 on the column unit.

Conversely, when the driver applies external force to the column unit in the standby mode direction while the column unit 20 is in the use mode (accidentally applying an impact), the column unit 20 may absorb external force, while rotating in the standby mode direction, to prevent damage to the components of the shift control apparatus.

The former case (external force applied in the use mode direction) may be when the driver intentionally applies external force to the column unit in the use mode direction, and the latter case (external force applied in the standby mode direction) may be when the driver unintentionally applies external force to the column unit in the standby mode direction. Since causes and effects of the external force applied to the column unit may be different, the external force to be applied in the former case may be set to be smaller than that in the latter case.

For example, when the first angle α of the first inclined surface 41s in the first groove portion 41a is set to be greater than the second angle β of the second inclined surface 41t, external force (external force applied to rotate in the use mode direction) that should be applied to the override unit 40 for the second protrusion 43b to contact and move along the first inclined surface may be smaller than external force (external force applied to rotate in the standby mode direction) that should be applied to the override unit of the second protrusion to contact and move along the second inclined surface.

For example, as an angle (obtuse angle) increases, the external force that should be applied to rotate the column unit 20 may be weaker, and as an angle (obtuse angle) decreases and approaches a right angle, the external force that should be applied to rotate the column unit may be stronger.

When the column unit 20 is disposed in an intermediate position between the use mode and the standby mode and an automatic position change of the column unit is performed, the column unit may meet a different stopper 16 provided on the cover 11 of the housing 10, and in the instant case, further rotation of the column unit may be prevented.

Whether the column unit 20 has normally reached the standby mode position due to override by the motor 31 may be confirmed by detecting by the Hall sensor 51, and then an automatic location change of the column unit may be normally executed between the standby mode and the use mode.

As described above, according to an exemplary embodiment of the present disclosure, a driver may manually rotate a column unit, and even in occurrence of a malfunction, the column unit may rotate from a standby mode to a use mode. Therefore, there may be an effect of further strengthening reliability of a shift control apparatus.

Furthermore, according to an exemplary embodiment of the present disclosure, damage to components forming a shift control apparatus may be prevented by rotating a column unit due to a strong external force. Therefore, there may be an effect of improving robustness and a service life of a product.

Furthermore, the term related to a control device such as "controller", "control apparatus", "control unit", "control device", "control module", "control circuit", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may be configured for processing data according to a program provided from the memory, and may be configured to generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the memory and the processor may be provided as one chip, or provided as separate chips.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

In an exemplary embodiment of the present disclosure, the vehicle may be referred to as being based on a concept including various means of transportation. In some cases, the vehicle may be interpreted as being based on a concept including not only various means of land transportation, such as cars, motorcycles, trucks, and buses, that drive on roads but also various means of transportation such as airplanes, drones, ships, etc.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the present specification, unless stated otherwise, a singular expression includes a plural expression unless the context clearly indicates otherwise.

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

According to an exemplary embodiment of the present disclosure, components may be combined with each other to be implemented as one, or some components may be omitted.

Hereinafter, the fact that pieces of hardware are coupled operably may include the fact that a direct and/or indirect connection between the pieces of hardware is established by wired and/or wirelessly.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A shift control apparatus comprising:
   a housing;
   a column unit including one end portion rotatably coupled to the housing, protruding from the housing in a radial direction, and operable for shifting;
   a driving unit provided in the housing and engaged to the column unit to rotate the column unit; and
   an override unit provided in the driving unit to transmit driving force to the column unit, and enable the column unit to rotate when external force is applied,
   wherein the driving unit includes:
      a motor fixed in the housing via a support member;
      a worm mounted on a motor axis of the motor;
      a worm wheel engaged with the worm;
      an intermediate gear mounted on a shaft and disposed coaxially with the worm wheel, and
      the override unit connecting the worm wheel and the intermediate gear,
   wherein the override unit includes:
      a first override gear unit formed on a second edge portion on an internal surface of the worm wheel;
      a plurality of spline groove portions formed on an internal surface of a side wall in an accommodation groove of the intermediate gear;
      an override ring member in which a second override gear unit engaged with the first override gear unit is formed on a first side, and a plurality of spline protrusions at least partially fitted into each of the spline groove portions are formed on a second side; and
      an elastic member located between the accommodation groove and the override ring member, and
      wherein the intermediate gear engages with a sector gear formed on the one end portion of the column unit.

2. The shift control apparatus of claim 1, further including:
   a permanent magnet;
   a printed circuit board; and
   a Hall sensor,
   wherein the permanent magnet is fixed on one side of an end portion of the shaft, wherein the printed circuit board provided with the Hall sensor and controlling driving of the motor is built in the housing, and wherein the Hall sensor detects rotation of the column unit through a change in magnetic flux of the permanent magnet due to rotation of the shaft.

3. The shift control apparatus of claim 1, wherein the worm wheel is rotatably supported in a support hole of the support member by a stepped portion formed on a first edge portion thereof, and wherein the shaft is disposed to pass through and rotates relative to the worm wheel, and is fixed to the intermediate gear to rotate together.

4. The shift control apparatus of claim 1, wherein the first override gear unit includes a plurality of first groove portions spaced from each other in a circumferential direction of the worm wheel and concavely formed in an axial direction of the worm wheel, wherein the second override gear unit includes a plurality of second protrusions spaced from each other in a circumferential direction of the override ring member and convexly formed in an axial direction of the override ring member to correspond to the first override gear unit, and wherein the plurality of second protrusions are respectively inserted into and engaged with the plurality of first grooves.

5. The shift control apparatus of claim 4, wherein first and second side walls of each of the first groove portions include a first inclined surface and a second inclined surface, respectively, and wherein first and second side surfaces of each of the second protrusions in a circumferential direction include a third inclined surface formed to correspond to the first inclined surface, and a fourth inclined surface formed to correspond to the second inclined surface.

6. The shift control apparatus of claim 5, wherein the first inclined surface is formed to be inclined at a first angle, an obtuse angle, from a bottom surface of each of the first groove portions, and wherein the second inclined surface is formed to be inclined at a second angle, an obtuse angle, from the bottom surface of each of the first groove portions.

7. The shift control apparatus of claim 6, wherein the first angle and the second angle are different from each other.

8. The shift control apparatus of claim 6, wherein a size of the first angle is greater than a size of the second angle.

9. The shift control apparatus of claim 5, wherein external force applied to the override unit so that each of the second protrusions contacts and moves along the first inclined surface is set to be smaller than external force applied to the override unit so that each of the second protrusions contacts and moves along the second inclined surface.

10. The shift control apparatus of claim 5, wherein the override ring member is movable relative to the worm wheel and/or the intermediate gear in a longitudinal direction of the shaft, and is pushed toward the worm wheel by the elastic member.

11. The shift control apparatus of claim 10, wherein, in response that the sector gear of the column unit rotates by external force, the intermediate gear engaged with the sector gear rotates, but the worm wheel does not rotate due to self-locking, and the second protrusion is inserted into another adjacent first groove over one of the first inclined surface or the second inclined surface, so that the override ring member in the intermediate gear rotates with respect to the worm wheel.

12. The shift control apparatus of claim 1, wherein the housing includes a cover covering an accommodation space therein, and wherein a plurality of stoppers limiting rotation of the column unit are provided on the cover.

13. A shift control apparatus comprising:

a housing;

a column unit including one end portion rotatably coupled to the housing, protruding from the housing in a radial direction, and operable for shifting;

a driving unit provided in the housing and engaged to the column unit to rotate the column unit; and an override unit provided in the driving unit to transmit driving force to the column unit, and enable the column unit to rotate when external force is applied, wherein the housing is fixed on a steering column in front of a steering wheel, wherein the steering column passes through the housing and the one end portion of the column unit, wherein the column unit rotates around the steering column in response that the driving unit operates, and changes a position thereof to a standby mode or a use mode, wherein the standby mode is a position in which the column unit extends from the front of the steering wheel in an upward direction, and wherein the use mode is a position in which the column unit rotates from the standby mode and is located to extend in a lateral direction of the steering wheel.

14. The shift control apparatus of claim 13, wherein external force applied to rotate the column unit from the standby mode toward the use mode is set to be smaller than external force applied to rotate the column unit from the use mode toward the standby mode.

15. A shift control apparatus comprising:

a housing located in front of a steering wheel;

a column unit including one end portion rotatably coupled to the housing, protruding from the housing in a radial direction, and operable for shifting;

a driving unit provided in the housing, and rotating the column unit according to a signal from an input unit; and an override unit provided in the driving unit to transmit driving force to the column unit, and enable the column unit to rotate when external force is applied, wherein the column unit is located in a standby mode which is a position extending from the front of the steering wheel in an upward direction, or a use mode which is a position extending in a lateral direction of the steering wheel, wherein the override unit is configured to transmit driving force to the column unit so that the column unit rotates by operation of the driving unit to change a position thereof from the standby mode to the use mode or from the use mode to the standby mode, and wherein the override unit is configured to rotate the column unit when an external force is applied, to change a position thereof from the standby mode to the use mode or from the use mode to the standby mode.

* * * * *